Nov. 10, 1964     E. JAEGER     3,156,235

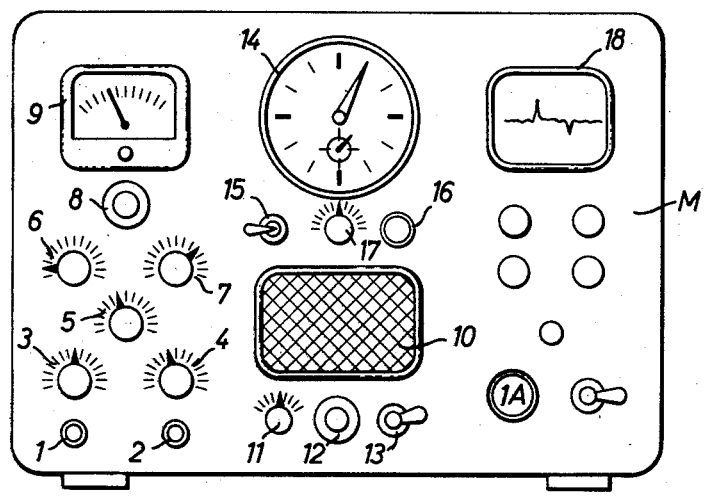
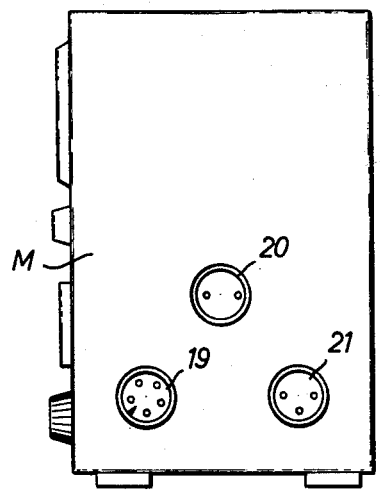
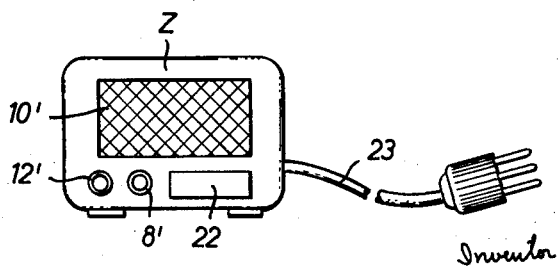

HEART MONITORING DEVICE

Filed Oct. 3, 1960     3 Sheets-Sheet 3

United States Patent Office 3,156,235
Patented Nov. 10, 1964

3,156,235
HEART MONITORING DEVICE
Erich Jaeger, Rontgenring 5, Wurzburg (Main), Germany
Filed Oct. 3, 1960, Ser. No. 59,957
Claims priority, application Germany Oct. 3, 1959
7 Claims. (Cl. 128—2.05)

This invention relates to a device for monitoring the function of the heart, which device will be referred to hereinafter as "monitor."

The purpose of apparatus of this kind is to survey the function of the heart of a patient, for instance after a heart operation, and to issue a warning signal in the case of arhythmia or cardiac arrest. It is possible to control the monitor by means of signals derived from an infrasonic microphone (pulse detector according to Boucke-Brecht), from a blood circulation measuring device with light source and photocell, or from an electro-cardiograph electrode. For such transducers the collective term "pulse or signal detecting head" will be used hereinafter.

Apparatus known hitherto issue a warning signal only after a collapse has occurred; it is, however, desirable that a warning signal be also produced before the collapse.

Moreover, it is important for the treating physician to know how much time has elapsed since the heart has stopped, because on this fact he must base the clinical measures to be undertaken. Due to the excitement prevailing in such emergency cases, the statements of the supervising personnel are usually inaccurate. Moreover, the known apparatus do not afford an accurate reading of the pulse beat frequency.

It is the object of the invention to provide an apparatus which avoids the above mentioned difficulties.

In particular, the apparatus according to the invention should allow the reading of the time that elapsed since the stopping of the heart, moreover it should give a preliminary warning in a state of impending collapse, and it should always indicate the accurate pulse beat frequency.

The apparatus according to the invention is characterised by the provision of two signal detecting heads.

Moreover, the apparatus is characterised by the provision of a measuring instrument for indicating the pulse beat frequency and of a clock mechanism which starts when the heart stops.

The two detecting heads are applied to the patient in a manner known from the blood cycle time determination. If the blood cycle time increases above or drops below a value adjusted by the physician, a warning signal is released.

The indication of an imminent collapse, hereinafter referred to as pre-collapse and the warning signal may also be produced by measuring and detecting the pulse volume. The pulse volume is measured for this purpose in a manner known per se, for instance at the ear lobe, at the large toe, or at the little finger, and it provides an indication of the blood pressure. The upper and the lower limits of the warning range are likewise adjustable. The known monitor devices only detect the pulse beat frequtncy or the electro-cardiograph which often are not free from fault, whilst the blood pressure may long have assumed values that would cause anxiety. Since the monitor according to the invention issues a warning signal also in such cases, prophylactic measures can be taken even before a collapse occurs.

According to a further improvement, the monitor may be provided with connecting sockets for a remote indicating device and/or a recording device. The remote indicating device may be formed by a small box, which comprises signalling lamps and a loud-speaker and which carries an identification plate on which the number of the bed and the name of the patient can be entered. The remote indication devices of several patients may be placed on a table in the ward or, if desired, in the duty room of the station.

The invention will now be described in more detail with reference to constructional examples shown in the drawings, wherein FIGURES 1 and 2 represent a front view and a side view respectively of a constructional example of a monitor according to the invention.

FIGURE 3 shows a remote indication device,

Figure 4:
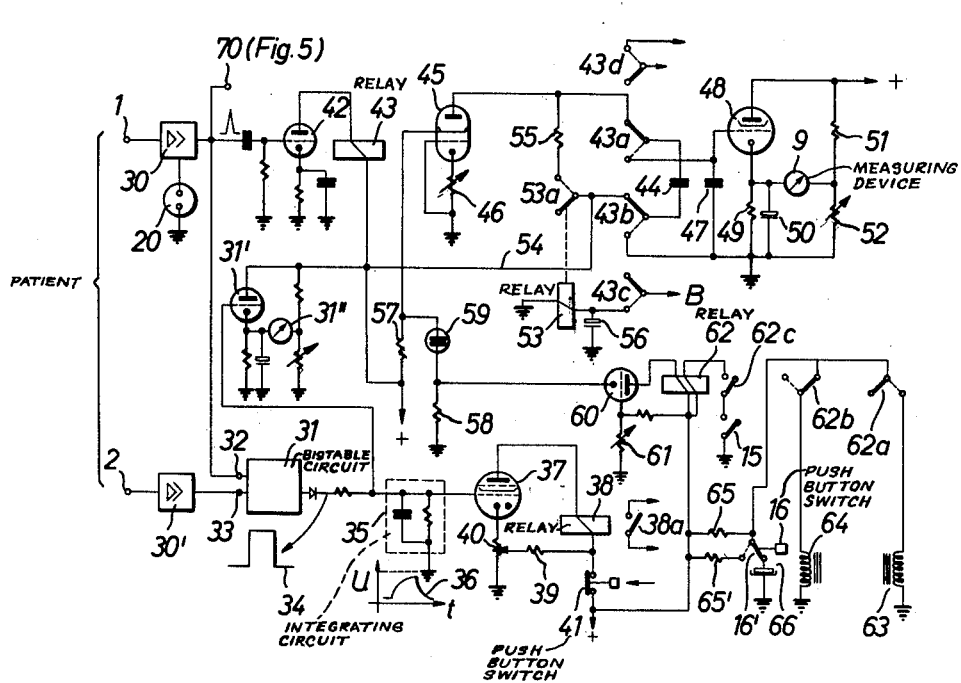
FIGURES 4 and 5 show partly diagrammatically circuit diagrams of certain functional units of the monitor.

The front view of the apparatus shown in FIGURE 1 shows two input sockets 1 and 2 for the connection of two pulse detecting heads of known construction, for instance infrasonic microphones. Further above, two adjusting devices 3, 4 for the individual adjustment of the sensitivity of the two channels are provided. The double-adjusting button 5 serves for the adjustment of the limits of the range of the blood cycle time, a warning being given when this time exceeds or falls below the mentioned limits. The adjusting devices 6, 7 serve for the adjustments of the lower and upper limits of the pulse beat frequency, a warning signal being issued when the pulse beat frequency exceeds or fails below these limits. The signalling lamp 8 (green) flashes in the rhythm of the pulse, whilst the pulse beat frequency is indicated by the device 9. A loud-speaker 10, the sound volume of which can be adjusted by means of an adjusting device 11, serves for an acoustic representation of the pulse beats and for producing the alarm signal. The lamp 12 (red) is switched on in the case of an alarm, and by means of the switch 13 it is possible to switch off the loud-speaker 10 of the monitor, but not the loud-speaker 10' of the remote indicating device (FIG. 3). A clock mechanism 14 with a second hand and minute hand serves for indicating the time that has elapsed since the stopping of the heart. The switch 15 serves for the selective adjustment of two operational conditions. In the one position, the clock continues to move even if, after the heart has stopped, its action is again resumed, whilst in the other position the clock is returned to zero when the heart action is again resumed, and the clock starts to move again after a repeated stoppage of the heart. The clock can be returned to its zero position by a button 16 to be operated by hand, and an adjusting device 17 serves for the adjustment of the time during which the heart must refunction in order to return the clock to zero. In this manner the clock is not returned to zero if the heart only starts to beat for a short time and then fails again.

Moreover, the plate at the front of the device may be provided with an oscillograph tube 18 for the indication of the electrocardiograph, with adjusting buttons for a built-in pace-maker, with mains switch and the like.

In the represented constructional example, a lateral wall (FIG. 2) is provided with connecting sockets 19, 20, 21 for a remote indication device, for a recording device and for the pace-maker electrodes. Alternatively, these connecting sockets may be arranged at any other suitable place of the device. It is also possible to accommodate the pace-maker within a separate casing, in which case the socket 21 serves for the connection of the connecting cable.

The arrangement may also be made such that the internal or external pace-maker automatically starts to operate when the heart stops and supplies beat impulses to electrodes applied to the heart with a frequency of about 60 cycles per second and with an amplitude adjustable between zero and about 15 v. Preferably however, the pace-maker is already caused to operate when the pulse beat frequency drops below a certain adjustable limit. The starting of the pace-maker, when the pulse beat frequency drops below an adjustable minimum value, may be effected by the same circuit members which release the alarm.

According to a further development of the invention, the pace-maker is switched on in the case of bradycardia with a certain time delay, for instance by means of a time-delay relay, and the time delay is made freely adjustable, preferably by hand, within certain limits, e.g. up to maximum 1 or 2 minutes, whilst when the heart stops, the pace-maker is taken immediately into operation.

FIGURE 3 represents the remote indicating device Z, which comprises a loud-speaker 10′, a pulse beat indicating lamp 8′, and an alarm signalling lamp 12′ for an optical alarm. The device is provided with an identification plate 22 on which the ward and the number of the bed and the name of the patient can be noted.

The device Z can be connected to the monitor by means of a cable 23. It may be placed within the ward or if desired within the duty room of the station.

Figure 5:
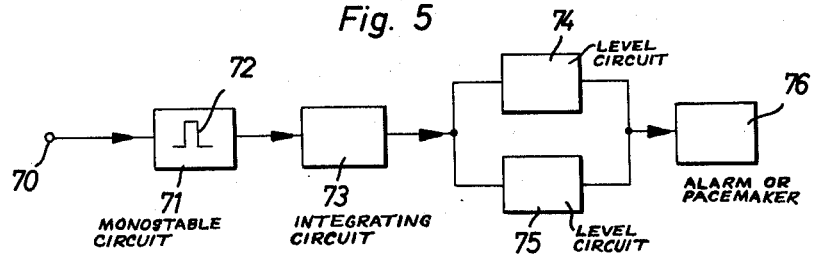

An example of a circuit arrangement for the device is shown in FIGURES 4 and 5, only the more essential parts being represented in a simplified manner. The signals supplied to the sockets 1 and 2 by the heads or transducers that serve for the detection of the pulse beats, are amplified by preliminary amplifiers 30, 30′. The amplifying stages of the preliminary amplifiers are preferably strongly overexcited, and the output contains a differentiating member so that pointed pulses accurately defined in time occur at the outputs of the amplifiers.

The circuit arrangement for determining the blood cycle time, which serves for a preliminary warning in the case of a pre-collapse, comprises a bi-stable circuit 31 of which the setting input 32 is connected to the output of the preliminary amplifier 30 in the first channel, whilst the resetting input 33 is connected to the output of the preliminary amplifier 30′ of the second channel. Thus, the length of the rectangular pulses 34 produced at the output of the bi-stable circuit 31 corresponds to the time delay between the signals in the first and in the second channel and is therefore a measure for the blood cycle time.

The circuit 31 may comprise for instance a bi-stable flip-flop circuit. Preferably however a pseudo bi-stable circuit may be used instead, that is to say a mono-stable circuit of which the time constant is larger than the largest possible interval between the signals arriving from channel 1 and channel 2. In this way it is achieved that the circuit arrangement, when it is switched on or after comparatively long intervals, is always in the correct operational state.

The rectangular pulse 34 is supplied to an integrating circuit represented diagrammatically by the rectangle 35. The voltage variations at the integrating circuit during a pulse 34 corresponds substantially to the curve 36, the voltage level reached at the end of the pulse being substantially proportional to the pulse length with correspondingly dimensioned circuit members. The integrating circuit is connected to a device which starts to operate when a certain adjustable voltage level is exceeded. This circuit may comprise a gas-filled tube 37 in the anode circuit of which a relay 38 is arranged. The cathode is positively biased through an adjustable voltage divider 39, 40, and by the adjustment of this voltage divider the grid voltage required for the ignition of the tube and therefore the maximum blood cycle time, which releases a warning signal, can be adjusted. The relay 38 is provided with a make contact 38a, which, when the relay operates, closes a circuit of the alarm arrangement.

The relay 38 remains energised until the valve 37 is extinguished which may be done by a short interruption of the anode voltage by means of a push-button switch 41 in the anode voltage supply conductor.

If a warning signal is to be produced also when the value drops below a certain limit, then the integrating member 35 and the following circuit including valve 37 may be replaced by the circuit to be described in connection with FIGURE 5; in this case, however, the mono-stable circuit 71 (FIG. 5) is replaced by the bi-stable circuit 31.

Moreover, it is possible to connect a circuit 31′ to the integrating device 35 or 73 which circuit comprises a measuring device 31″ for the indication of the blood cycle time. The circuit, designated as a whole by 31′, may be constructed in the same manner as the circuit for the measuring device 9 for the indication of the pulse beat frequency, which device will be described in more detail hereinafter.

Moreover, a circuit for the indication of the pulse beat frequency, a circuit for starting the clock mechanism and an alarm circuit may be connected to the output of the preliminary amplifier 30 in the first channel, which alarm circuit operates when the pulse beat frequency falls below an adjustable lower limit or exceeds an adjustable upper limit.

For the accurate indication of the pulse beat frequency, a tube 42 is connected to the output of the amplifier 30, which tube is so arranged that, when inoperative, practically no anode current flows. It is assumed in this connection that the amplifier 30 supplies positive output pulses. A relay 43 is arranged in the anode circuit of the valve 42 which relay operates for a short time when a positive pulse arrives at the grid of the valve 42. The relay 43 has two change-over contacts 43a, 43b and two make contacts 43c, 43d. The contacts are shown in the normal position of the relay 43.

In the represented normal position of the change-over contacts 43a, 43b, a capacitor 44 is connected via these contacts in the anode supply conductor of a pentode 45 which serves as a source of a constant current. In order to adjust this current, a cathode resistor 46 of the pentode may be made adjustable.

When the relay 43 is operated, the movable contacts of the change-over contacts 43a, 43b are changed over into the position shown by dashed lines; as a result, the capacitor 44 is connected in parallel to a capacitor 47 which is arranged between the control grid of a valve 48 and ground. The measuring device 9 which indicates the pulse beat frequency, is arranged in the cathode circuit of the valve 48. The cathode resistor 49 is shunted by a suitably dimensioned capacitor 50 which serves for damping the measuring device. The other connection of the measuring device is connected to a voltage divider 51, 52 for the compensation of the closed-circuit current of the valve and for the zero adjustment. A tube with logarithmic characteristic is preferably used for the tube 48.

The make contact 43c of the relay 43 is arranged in a circuit which leads from a suitable operating voltage source B via a relay 53 to earth. The relay 53 has a make contact 53a, which is arranged between the anode-voltage supply conductor 54 for the tube 45 on the one hand, and a current-limiting resistor 55 at the anode of the tube 45 on the other hand. The relay 53 releases with a certain time delay which can be obtained by a parallel connected capacitor 56. The relay 53 preferably comprises a gas-discharge device with corresponding time-constant members.

The make contact 43d of the relay 43 is arranged in the circuit of the signalling lamp 8 for the indication of the pulse beat and, if desired, in the circuit of a buzzer or an audio-frequency generator with adjustable pitch of tone for the acoustic indication of the pulse beats via the loud-speakers 10 and 10' respectively.

The capacitor 47 is so dimensioned that the time constant of the grid circuit of the tube 48 is large compared with the smallest pulse beat frequency. On the other hand, the capacitor 44 is large in relation to the capacitor 47.

This circuit arrangement operates as follows: The capacitor 44 is charged between two pulse beats by a constant current supplied by the tube 45. At the next pulse beat, the capacitor 44 is connected in parallel to the capacitor 47 by means of the change-over contacts 42a, 43b whereby the last mentioned capacitor is charged to practically the same voltage in view of the fact that it is substantially smaller than the capacitor 44. Thus, the anode current of the tube 48 and consequently the deflection of the instrument 9 is a measure for the time that elapsed between two pulse beats and therefore a measure for the pulse beat frequency. Due to the high time-constant of the grid current of the tube 48, the indication is maintained up to the next pulse beat. Simultaneously with the parallel connection of the capacitors 44 and 47, the circuit of the relay 53 is closed so that the make contact 53a of this relay closes.

After the termination of the electric pulse, the relay 43 again releases and the capacitor 44 is again connected in the anode circuit of the tube 45. Since the relay 53 releases with a certain time delay however, the capacitor 44 discharges via the resistor 55 and the still closed make contact 43a. After the release of the relay 53, the capacitor 44 is again charged and the operational cycle starts again.

For the indication of the pulse beat frequency an electromagnetic counter (telephone counter) may also be used, which counter is reset every minute. The counter then replaces for instance the relay 43.

When the heart has stopped, no pulses arrive at the input of the channel 1 so that the relay 43 remains in its inoperative position and the capacitor 44 is charged practically to the full anode voltage of the tube 45. As a result, the anode current of the tube 45 drops to zero and the screen-grid current increases at the same rate. Due to the increase of the screen-grid current, the voltage drop at the screen grid resistor 57 becomes so large that a glow lamp 59, connected in the connection between the screen grid and ground via a small resistor 58, extinguishes. The resistor 58 is connected as cathode resistor of a tube 60, the grid of which is biassed through a voltage divider 61 in such a manner that the tube is non-conducting when the glow lamp 59 is ignited, but is conducting when the glow lamp is extinguished. A relay 62 with two make contacts 62a and 62c as well as with a break contact 62b is arranged in the anode circuit of the tube 60.

The relay 62 releases with time delay which may amount for instance to about 30 to 60 seconds at the maximum, and it can be adjusted by means of an adjusting button 17 (FIG. 1).

The make contact 62a is connected in a circuit which comprises an electromagnetic device 63 for the starting of the clock mechanism 14. The circuit of the break contact 62b comprises an electromagnetic device 64 for stopping and for returning the clock mechanism to zero. A resistor 65 arranged in this circuit is so dimensioned that a current in the restoring circuit is not sufficient to operate the electromagnetic device 64. If, however, the break contact 62b is opened when the relay 62 operates, a capacitor 66 is charged. When now the relay 62 again releases, the charge stored in the capacitor 66 is sufficient to operate for a short time the device 64 and to return the clock to zero.

The relay 62 carries, moreover, a holding winding which is arranged in series with the make contact 62c and with a make-and-break switch 15. If the switch 15 is open, the clock mechanism 14 is returned to zero if the heart of the patient starts to beat again for a time which is longer than the adjusted release delay of the relay 62. When the switch 15 is closed, the clock mechanism continues to operate even if, after a stoppage of the heart, the heart starts to beat again.

A change-over switch 16, which can be operated by hand (button 16 in FIG. 1), allows to return the clock to zero any time, and this effected by a disconnection of the capacitor 66 and by a connection of a resistor 65' parallel to the resistor 65 which is so dimensioned that the magnet coil 64 becomes energised.

The circuit shown in FIGURE 5 by means of a block diagram serves for producing a warning signal in the case of arhythmia or in the event that the limit values adjusted for the blood cycle time and exceeded. A monostable circuit 71 is connected to the output 70 of the amplifier 30 (FIG. 4) which circuit produces a rectangular pulse 72 of constant amplitude and width on the arrival of a pulse. The mentioned rectangular pulse (that is to say the output pulses of the circuit 31) is integrated by means of an integrating circuit 73 to which are connected two level circuits 74 and 75. The level circuit 74 operates when the time integral of the pulses exceeds a certain adjustable value, whilst the level circuit 75 operates when the time integral drops below a certain adjustable value. The adjustment can be continuously effected at the adjusting buttons 6 or 7 (FIG. 1). When the level circuits operate an alarm or pacemaker device 76 is released, for instance via the relay 38 of FIGURE 4, which relay may be provided with a second operating winding. The level circuits may be constituted by biased tubes, gas-filled electron tubes, Schmitt triggers, and similar suitable circuits.

Figure 6:
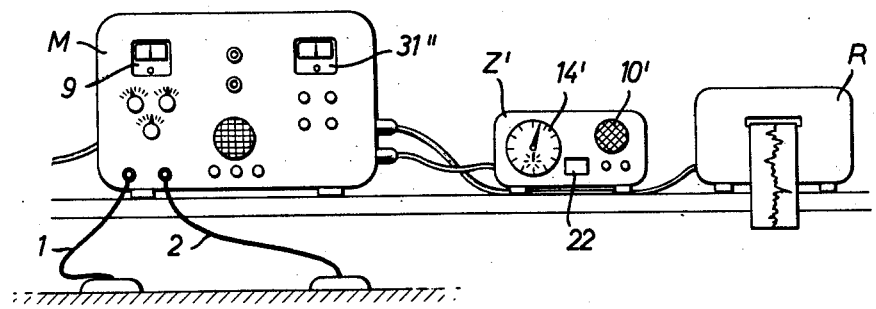
FIGURE 6 illustrates in a simplified manner a monitor of, to some extent, modified construction connected to a patient, together with a remote indicating device and recording device.

FIGURE 6 represents a, to some extent, modified arrangement of the monitor M according to the invention. In addition to the measuring device 9 for the indication of the pulse beat frequency, the monitor M also comprises a measuring device 31" for the indication of the blood cycle time. With this embodiment, the clock mechanism 14' is accommodated in a separate or remote indication device Z' which, just as the additional device Z shown in FIGURE 3, comprises a loud-speaker 10', signalling lamps and an identification plate 22. Moreover, a recording device R is connected to the monitor M.

Finally, the monitor is preferably provided with a pulse generator (for instance a time-base generator containing a gas-filled tube, and unstable flip-flop, an oscillating device, or the like) for the calibration of the indication devices, recording devices, alarm circuits, pacemaker etc. The output frequency of the pulse generator may be constant, e.g. 60 pulses per minute, or continuously or stepwise adjustable and include means for reading off the adjustment.

What I claim is:

1. A device for monitoring the function of the heart of a patient, comprising, in combination: a pulse beat detecting means for contacting a patient's body at a location where pulse beats may be sensed; circuit means connected to said detecting means for actuating an alarm when the pulse beat frequency deviates from a predetermined and adjustable range, said circuit means including a clock mechanism arranged to start operation during the time that no beat is detected by said detecting means and thus when the heart is stopped; a pacemaker and an adjustable delay circuit connected to said circuit means and said pacemaker and arranged for automatically starting said pacemaker when the limits of a predetermined adjustable range of the pulse beat frequency are exceeded.

2. A device for monitoring the function of the heart of a patient, comprising, in combination:
   (a) pulse beat detecting means for contacting a patient's body at a location where pulse beats may be sensed; and (b) circuit means connected to said detecting means including
   (1) means for actuating an alarm when the pulse beat frequency deviates from a predetermined and adjustable range, and
   (2) means for timing the duration of heart cessation and operable during the time that no beat is detected by said detecting means.

3. A device as defined in claim 2, comprising means for re-setting said timing means to zero after a predetermined and adjustable time period during which the pulse beats stop and then begin again.

4. A device as defined in claim 3 wherein said re-setting means are actuated after a time delay.

5. A device as defined in claim 2 comprising second pulse beat detecting means for contacting a patient's body at a location where pulse beats may be sensed and spaced from said first-mentioned pulse beat detecting means; a blood cycle time determining circuit connected to said pulse beat detecting means for producing an output signal depending upon the time difference between signals from said detecting means; and a warning circuit connected to said determining circuit for responding when said output signal deviates from a predetermined and adjustable range.

6. A device as defined in claim 5 wherein said warning circuit includes a high level stage which responds when the frequency-dependent signals exceeds a predetermined value, and a low level stage which responds when the frequency-dependent signal falls below a predetermined value.

7. A device as defined in claim 6 comprising remote indicating means connected to said warning circuit for providing a warning signal which may be sensed by a human being.

References Cited in the file of this patent

UNITED STATES PATENTS

| | | |
|---|---|---|
| 2,352,875 | Williams | July 4, 1944 |
| 2,368,207 | Eaton | Jan. 30, 1945 |
| 2,699,465 | Hamilton | Jan. 11, 1955 |
| 2,829,637 | McCormick | Apr. 8, 1958 |
| 2,848,992 | Pigeon | Aug. 26, 1958 |

OTHER REFERENCES

"Electrical Engineering," by Erickson and Bryant, published 1958 by John Wiley & Sons, New York.